United States Patent [19]
Ash

[11] 3,906,432
[45] Sept. 16, 1975

[54] GRATING GUIDES FOR ACOUSTIC SURFACE WAVES

[75] Inventor: Eric Albert Ash, London, England

[73] Assignee: International Business Machines Corporation, Armonk, N.Y.

[22] Filed: June 27, 1973

[21] Appl. No.: 374,172

Related U.S. Application Data

[63] Continuation-in-part of Ser. No. 273,576, July 20, 1972.

[52] U.S. Cl................. 340/15; 333/30 R; 333/70 R
[51] Int. Cl. ............................................ H04b 11/00
[58] Field of Search...................... 333/30 R; 340/15

[56] References Cited
UNITED STATES PATENTS

| | | | |
|---|---|---|---|
| 3,277,404 | 10/1966 | Fabian | 333/30 R |
| 3,381,246 | 4/1968 | Perry | 333/30 R |
| 3,406,358 | 10/1968 | Seidel et al. | 340/15 |
| 3,409,848 | 11/1968 | Meitzler et al. | 340/15 |
| 3,768,032 | 10/1973 | Mitchell | 333/30 R |

OTHER PUBLICATIONS

IBM Technical Disclosure Bulletin, E. A. Ash, Tapered Grating Reflectors, Vol. 13, No. 5, Oct. 1970.

*Primary Examiner*—Maynard R. Wilbur
*Assistant Examiner*—T. M. Blum
*Attorney, Agent, or Firm*—John E. Hoel; John G. Wynn

[57] ABSTRACT

Waveguides for use with guided elastic waves wherein the lateral leakage rate of the waveguides is very small. The decreased leakage rate is effected by longitudinal strip regions or gratings periodically spaced on either side of the main waveguide region. These periodically spaced gratings rapidly decrease the rate of the evanescant portion of the wave according to a geometric law. Further, by controlling the amount of discontinuity presented by the periodic gratings the rate of evanescance may be controlled.

6 Claims, 3 Drawing Figures

PATENTED SEP 16 1975   3,906,432

GRATING GUIDES FOR ACOUSTIC SURFACE WAVES

This is a continuation-in-Part of application Ser. No. 273,576, filed July 20, 1972.

FIELD OF THE INVENTION

This invention relates to elastic waveguides.

BACKGROUND OF THE INVENTION

Elastic waves are used in a variety of signal processing devices. While the existence of elastic waves has been known for many years, only recently have advances in such technology as materials and fabrication permitted the practical implementation of elastic wave devices. One reason for the high interest in elastic waves resides in the fact that they are typically five orders of magnitude slower than electromagnetic waves. This much slower velocity of elastic waves enables transmission components such as filters, resonators, and delay lines to be constructed on a subminiature scale. The further development of devices such as amplifiers, detectors and modulators make elastic wave technology an extremely valuable tool in electronic signal processing.

Waveguide techniques used to guide elastic waves and optical waves are similar in many respects, and many techniques employed in one technology are applicable in the other. For example, both elastic waves and optical waves can be guided on the surface of a material by either making the phase velocity characteristics slower or less than the phase velocity characteristics of the wave in the surrounding medium or by providing discontinuous boundaries on either side of the waveguide which will confine the wave within the waveguide. If, in the optical case, a metal boundary on either side of the waveguide is provided or, in the acoustic case, an infinitely rigid boundary on either side of the waveguide exists, confinement is complete. Alternately, if the wave velocity within the waveguide is markedly lower than the wave velocity of the surrounding region, the confinement is also complete in the sense that no energy is "leaked" from the desired mode, even though much of the energy may be propagating outside the waveguide. In practice, however, there are several technological difficulties associated with either approach. It is difficult from a fabrication standpoint to provide a sufficiently marked discontinuity at the waveguide boundaries to confine the wave without resorting a velocity difference inside and outside the regions. The technique used for lowering the velocity within the waveguide has thus far resulted in lossy waveguides. They are prohibitively so at microwave frequencies. Further, since fabrication techniques have limited leakage rate reduction capabilities, the ability to vary the leakage rates have also been limited.

Accordingly, a principal object of this invention is to reduce the lateral leakage rate of surface elastic waves traveling in surface waveguides in an improved manner.

It is another object of this invention to improve the control of the lateral leakage rate of waves in surface waveguides.

SUMMARY OF THE INVENTION

It has been discovered that the lateral leakage rate of surface elastic waves propagating in waveguides may be significantly reduced by periodically spacing additional longitudinal discontinuities on either side of the waveguide approximately parallel thereto. These parallel longitudinal discontinuities are constructed in the same manner as the main waveguide and are spaced at distances approximately equal to integrals of the lateral width of the waveguide. The leakage rate becomes rapidly smaller as the number of discontinuities is increased, permitting the leakage rate to be controlled by selection of the number of discontinuities.

DETAILED DESCRIPTION

Figure 1:
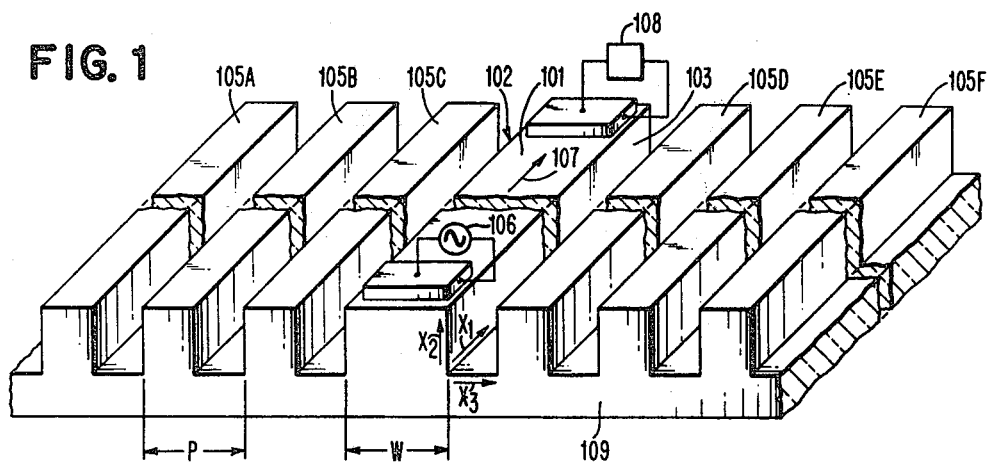
FIG. 1 shows a topographic grating guide for acoustic surface waves.

FIG. 1 shows a topographic grating guide for acoustic surface waves. Theoretical considerations indicate that when the width W of guide 101 is wide relative to the Rayleigh wave-length, guide 101 can be operated under conditions when only surface wave leakage can occur. The surface wave leakage may be minimized by making the discontinuity at edges 102 and 103 of of guide 101 as extreme as possible. The two possible techniques of minimizing are to make guide 101 very high or to undercut guide 101. A third technique for minimization which is not technologically difficult has been discovered. This third minimization technique is to space periodic arrays of discontinuities or ridges 105 (A–F) on either side of guide 101. While presently the discontinuity offered by each step of the periodic array has not been mathematically determined, experimental results indicate that the effect of the various periods of the gratings will be multiplicative. Thus, if the power leakage arising from the use of one slot is $n$, the power leakage from the use of m slots will reduce this leakage to $n^m$. With each of the ridges 105(A–F) about one wavelength in height Q's of the order of several hundreds can be obtained, suggesting that the use of three ridges should make the leakage completely negligible. The exact shape of the slots should not matter greatly.

The presence of these ridges 105(A–F) reduces the bandwidth of guide 101. However, it is important to note that acoustic surface waves are not very dispersive over the operating range of guide 101.

Theoretical indications further indicate that the periodicy P of ridges 105(A–F) is approximately equal to the width W of ridge 101, i.e., $P \cong W$. This has the important consequence that none of the grating ridges 105(A–F) on either side of the main guiding ridge 101 can support a low leakage wave. Thus, there are no problems associated with mode conversion into the meighboring channels. A second important point to note is that the smallest critical dimension is well within the current fabrication capabilities of the art and, thus, the resolution required is substantially easier to achieve than an interdigital transducer designed for the same frequency range. Moreover, there will be no critical tolerances on the ridge-to-valley width.

The topographic guide 101 of FIG. 1 offers the advantage of being made of a single material 109. This is particularly important at the higher operating frequencies because of the difficulty of finding two compatible, low-loss materials.

Figure 2:
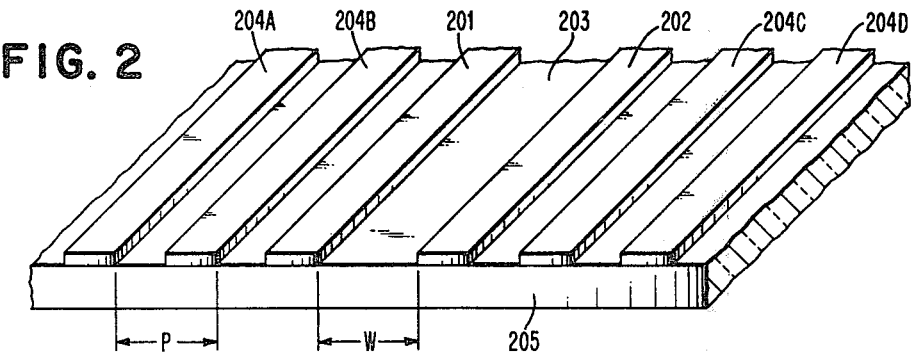
FIG. 2 shows a thin film grating guide for use with acoustic surface waves.

FIG. 2 shows a thin film grating guide for use with acoustic surface waves, where the gratings are provided by a deposited film which mass-loads the surface. Longitudinal regions or deposited layers 201 and 202 define the waveguide region 203 wherein acoustic surface waves propagate. Deposited layers 204(A–D) function as periodic discontinuities in a similar manner as described for the topographic grating guide of FIG. 1. In principal, deposited layers 201, 202 and 204(A–D) could have faster or slower shear velocity characteristics than substrate 205. The slower shear velocity characteristic is preferred, since deposited layers 201, 202 and 204(A–D) are bound to perturb the velocity of the waves somewhat, in the direction of the velocity of deposited layers 201, 202 and 204(A–D). Thus, a fast film would bring the guide velocity closer to the shear velocity of substrate 205, making bulk reactions at bends and discontinuities hard to avoid. While deposited layers 201, 202 and 204(A–D) with slow velocity characteristics act as guides, the guide velocity will be far removed from that of the main guide 203, which is very close to the Rayleigh velocity of substrate 205. Thus, cross-coupling problems are unlikely to be serious.

A "slow-on-fast" guiding structure in which deposited layers 201, 202 and 204(A–D) have a slower velocity characteristic than substrate 205, may be achieved with such materials as gold stripe for longitudinal regions 201, 202 and 204(A–D) and fused silica for substrate 205. To achieve the opposite situation of a "fast-on-slow" guiding structure, an aluminum film for longitudinal regions 201, 202 and 204(A–D) and T-40 delay-line glass for substrate 205 may be used. If a strongly piezoelectric substrate is used, it is possible to realize a grating which relies soley on the reflections occasioned by shorting out the piezo field. Guides are then possible using very thin metallic films, so thin that the acoustic loss is quite negligible, even at microwave frequencies. A large number of strips would be required, perhaps of the order of 50 on either side of the guiding region 203. As a result, the guidance would be effective over a narrow frequency range only; however, as noted above, this narrow band of operation is not associated with high dispersion in the operating band. Further, resorting to more complicated gratings, it is possible to broad-band the device by tapering the periodicy.

Figure 3:
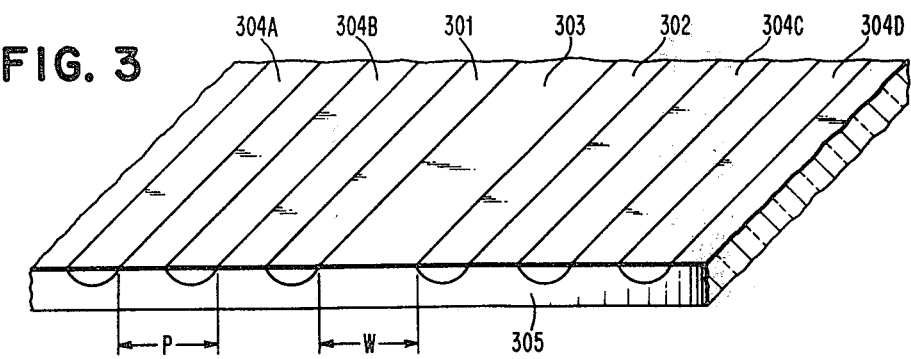
FIG. 3 shows a doped grating guide for acoustic surface waves.

FIG. 3 shows a doped grating for guiding acoustic surface waves. It is well known that acoustic velocity in a semiconductor is dependent upon the doping density. For example, in germanium it is possible to obtain a change reduction of the shear velocity of 3% by doping. This velocity reduction could serve as a waveguide channel. These velocity reduction which can be obtained, through sizable, are less than preferred for a robust guiding system. Moreover, although it is known that some semiconductor materials, notably silica, have a relatively low acoustic loss, this applies only to the pure material. The losses in the doped material appear to be substantially higher.

For these reasons a grating guide as shown in FIG. 3 offers a number of significant advantages. First, smaller doping densities are sufficient, and secondly, most of the energy is propagating in the undoped region. The acoustic losses can, therefore, be expected to be substantially smaller. Finally, the width of the channel is substantially larger than would be required in a single channel guide.

Thus, in FIG. 3 longitudinal regions 301 and 302 define the guiding surface 303. Longitudinal regions 304(A–D) are periodically spaced from longitudinal regions 301 and 302 in a similar manner as described for the topographical grating guide of FIG. 1. That is, the periodicy P is approximately equal to the width W of guiding surface 303. Longitudinal regions 301, 302 and 304(A–D) are formed by appropriate doping of semiconductor substrate 305.

OPERATION OF THE INVENTION

The operation of the invention for acoustic surface waves can generally be described with reference to FIG. 1. Tranducer 106 couples acoustic surface waves onto surface 101. As these acoustic surface waves travel along surface 101 in the direction indicated by arrow 107, their lateral leakage rate is reduced to negligible proportions as a result of the periodic discontinuities presented by the periodically spaced grating 105(A–F). Finally, the acoustic surface wave reaches a second transducer 108, which changes the acoustic surface wave in electrical signal output.

Of course, once the acoustic surface wave has been coupled onto the waveguide, they may perform various functions before they are coupled out. However, this invention is primarily concerned with the configuration of the waveguides themselves.

ADVANTAGES

From the above detailed description, the advantages of this invention are now readily apparent. The lateral leakage rate of acoustic surface waves traveling in acoustical waveguides is significantly reduced by spacing periodic gratings on either side of the waveguide region. These periodic gratings which represent lateral discontinuities to the waves are spaced at a distance approximately equal to the width of the guiding region. The amount of leakage reduction is controllable by the specific number of gratings selected.

While the invention has been particularly shown and described with reference to the preferred embodiments thereof, it will be understood by those of skill in the art that various changes in form and detail may be made therein without departing from the spirit and scope of the invention. For example, other functions may be accomplished using the grating guide technique, such as directional couplers.

I claim:

1. A structure for guiding waves comprising:
    a substrate material having at least one surface upon which elastic waves propagate;
    an input means for coupling said acoustic waves onto said surface;
    an output means for coupling said acoustic waves off of said surface;
    a waveguide region extending longitudinally in the direction of wave propagation on said surface of said substrate material, the lateral extent of which is bounded by longitudinal edges which provide sharp discontinuity for said surface waves; and
    a plurality of longitudinal discontinuities approximately parallel to said longitudinal waveguide region and periodically spaced from said waveguide region;

said periodicity of said plurality of longitudinal discontinuities being approximately equal to said lateral extent of said longitudinal waveguide region.

2. The structure of claim 1, wherein an even number of said plurality of longitudinal discontinuities are equally divided on either side of said longitudinal waveguide region.

3. The structure of claim 1, wherein said longitudinal waveguide region and said plurality of said longitudinal discontinuities are localized deformations of said surface of said substrate material.

4. The structure of claim 1, wherein said longitudinal waveguide region and said plurality of said longitudinal discontinuities have a first phase velocity characteristic; and said substrate material having a second phase velocity characteristic, said first phase velocity characteristic being greater than said second phase velocity characteristic.

5. The structure of claim 4, wherein said longitudinal waveguide region and said plurality of longitudinal discontinuities are layers of a deposited material on said surface of said substrate material;

said deposited material being different than said substrate material.

6. The structure of claim 1, wherein said substrate material is a semiconductor; and wherein said longitudinal waveguide region and said plurality of longitudinal discontinuities are separated on said surface of said substrate material by a plurality of diffused regions having a phase velocity characteristic slower than the phase velocity characteristic of said substrate material.

* * * * *